(12) United States Patent
Chang

(10) Patent No.: US 8,041,342 B2
(45) Date of Patent: Oct. 18, 2011

(54) MOVING NOTIFICATION MESSAGE

(75) Inventor: Doo Yi Chang, Seoul (KR)

(73) Assignee: LG Electronics Inc, Seoul (KR)

( * ) Notice: Subject to any disclaimer, the term of this patent is extended or adjusted under 35 U.S.C. 154(b) by 915 days.

(21) Appl. No.: 11/955,115

(22) Filed: Dec. 12, 2007

(65) Prior Publication Data

US 2008/0220745 A1 Sep. 11, 2008

(30) Foreign Application Priority Data

Mar. 5, 2007 (KR) .................. 10-2007-0021381

(51) Int. Cl.
*H04M 1/725* (2006.01)
*H04B 1/38* (2006.01)
(52) U.S. Cl. .................. 455/412.2; 455/558; 379/88.12
(58) Field of Classification Search ............... 455/412.2, 455/558; 379/67.1
See application file for complete search history.

(56) References Cited

U.S. PATENT DOCUMENTS

| | | | | |
|---|---|---|---|---|
| 5,687,216 | A  * | 11/1997 | Svensson | 455/412.2 |
| 7,151,922 | B2 * | 12/2006 | Sashihara et al. | 455/412.2 |
| 7,640,039 | B2 * | 12/2009 | Kamada | 455/558 |
| 7,738,854 | B2 * | 6/2010 | Asai et al. | 455/403 |
| 2003/0040299 | A1 * | 2/2003 | Laumen et al. | 455/412 |
| 2005/0023373 | A1 * | 2/2005 | Goettl | 239/200 |
| 2007/0191057 | A1 | 8/2007 | Kamada | |

FOREIGN PATENT DOCUMENTS

KR 20050064022 * 10/2006
WO WO 2005/086519 A1 9/2005

* cited by examiner

*Primary Examiner* — Patrick Edouard
*Assistant Examiner* — Huy Ho
(74) *Attorney, Agent, or Firm* — Birch, Stewart, Kolasch & Birch, LLP (57) ABSTRACT

A computer program product, method and a terminal for receiving and processing a notification message for notifying a second terminal of an arrival of a multimedia message addressed to a Subscriber Identity Module (SIM) of a first terminal installed in the second terminal and storing the received notification message in the SIM card.

15 Claims, 6 Drawing Sheets

MOVING NOTIFICATION MESSAGE

CROSS REFERENCE TO RELATED APPLICATIONS

This application claims priority under 35 U.S.C. §119(a) on Patent Application No. 10-2007-0021381 filed in Republic of Korea on Mar. 5, 2007, the entire contents of which are hereby incorporated by reference.

BACKGROUND

1. Field of the Invention

This document relates to moving notification message.

2. Related Art

Recently, Multimedia Message Services (MMS) have become more widely available for mobile communication terminals. A multimedia message provided by MMS may include audio, image or video files.

Suppose that a first subscriber has received a multimedia message through a first communication terminal, in which the multimedia message was sent by a second subscriber through a second terminal. The first subscriber is capable of using the multimedia message if the first communication terminal has equipped with a Subscriber Identity Module (SIM) card of the first subscriber. Thus, the purpose of the second subscriber to send the multimedia message to the first subscriber can be achieved.

However, the first subscriber is not capable of using the multimedia message through the first communication terminal, which is his or her own communication terminal, if the first subscriber temporarily inserted the SIM card to a third communication terminal, which is not his or her own communication terminal, and has received a notification message of the multimedia message through the third communication terminal.

SUMMARY

In one general aspect, the invention is directed to a method, computer program product and terminal for receiving a notification message for notifying a user or user's terminal of an arrival of a multimedia message, and storing the received notification message in a Subscriber Identity Module (SIM) card.

The invention may further include a display of a screen inquiring whether or not the user wants to store the received notification message in the SIM card.

The invention may still further include the ability to compare a recipient phone number included in the received notification message with that of a previously received notification message stored in an internal storage, and to store the received notification message in the SIM card if the recipient phone numbers are not identical.

In another aspect, the invention includes a terminal having a communication module for receiving a notification message for notifying of an arrival of a multimedia message. The terminal may further include a Subscriber Identity Module (SIM) card for storing notification messages, and a controller for storing the received notification message at the SIM card.

In still another aspect, the invention includes the ability to detect an insertion of a Subscriber Identity Module (SIM) card that stores a notification message for notifying of an arrival of a multimedia message. The invention includes the ability to then request a Multimedia Message Service (MMS) server to download the multimedia message based on the notification message stored at the SIM card, and to download the multimedia message from the MMS server.

Further features will be apparent from the following description, including the drawings, and the claims.

BRIEF DESCRIPTION OF THE DRAWINGS

The details of one or more implementations are set forth in the accompanying drawings and the description below. In the entire description of this document, like reference numerals represent corresponding parts throughout various figures.

DETAILED DESCRIPTION

Hereinafter, exemplary implementations of notification message moving will be described in detail with reference to the accompanying drawings.

Figure 1:
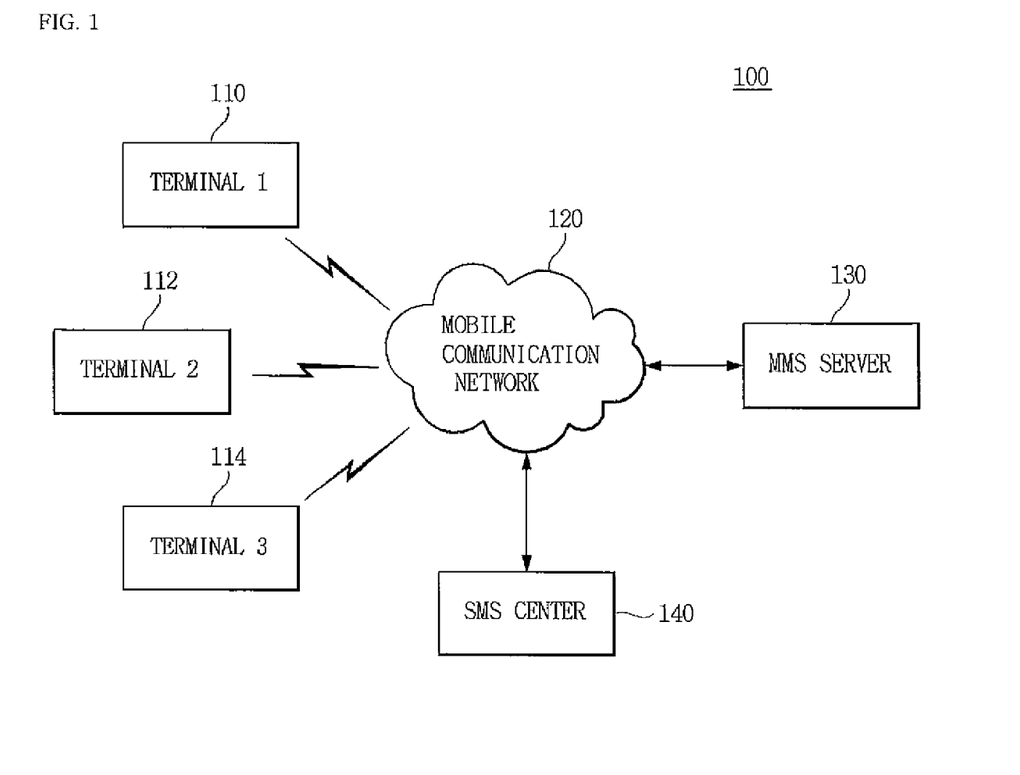
FIG. 1 is a view of a multimedia message communication system diagram.

FIG. 1 schematically shows a view of a multimedia message communication system diagram.

The multimedia message communication system 100 comprises a first terminal 110, a second terminal 112, a third terminal 114, a mobile communication network 120, an MMS server 130, and a Short Message Service (SMS) center 140.

The first, second, and third terminals 110, 112, and 114 include SIM cards inserted by subscribers to transmit and receive data or to connect calls with other parties based on information embedded in the SIM cards, respectively.

The first, second, and third terminals 110, 112, and 114 may store notification messages received through the mobile communication network 120 at their SIM cards or internal storages, respectively.

The first, second, and third terminals 110, 112, and 114 may download multimedia messages based on the notification messages stored in the SIM cards or the internal storages, respectively.

The mobile communication network 120 provides paths for the first, second, and third terminals 110, 112, and 114 to access the MMS server 130 and further provides paths for downloading the multimedia messages from the MMS server 130.

Any of the first, second, and third terminals 110, 112, and 114 may request that the MMS server 130 transmit a multimedia message. The MMS server 130 then transmits to a recipient terminal a notification message notifying the recipient terminal that the multimedia message is to be received.

Each of the first, second, and third terminals 110, 112, and 114 may receive a notification message from the MMS server 130 notifying them of the existence of a multimedia message to be received. The MMS server 130 transmits each of the multimedia messages to one of the first, second, and third terminals 110, 112, and 114 upon receiving a corresponding request for downloading the multimedia messages identified in the corresponding notification message.

The MMS server 130 includes database (not shown) for storing notification messages and multimedia messages to be transmitted to subscriber terminals.

The SMS center 140 converts a notification message to a SMS message format to transmit the notification message in the SMS message format to the recipient terminal.

Figure 2:
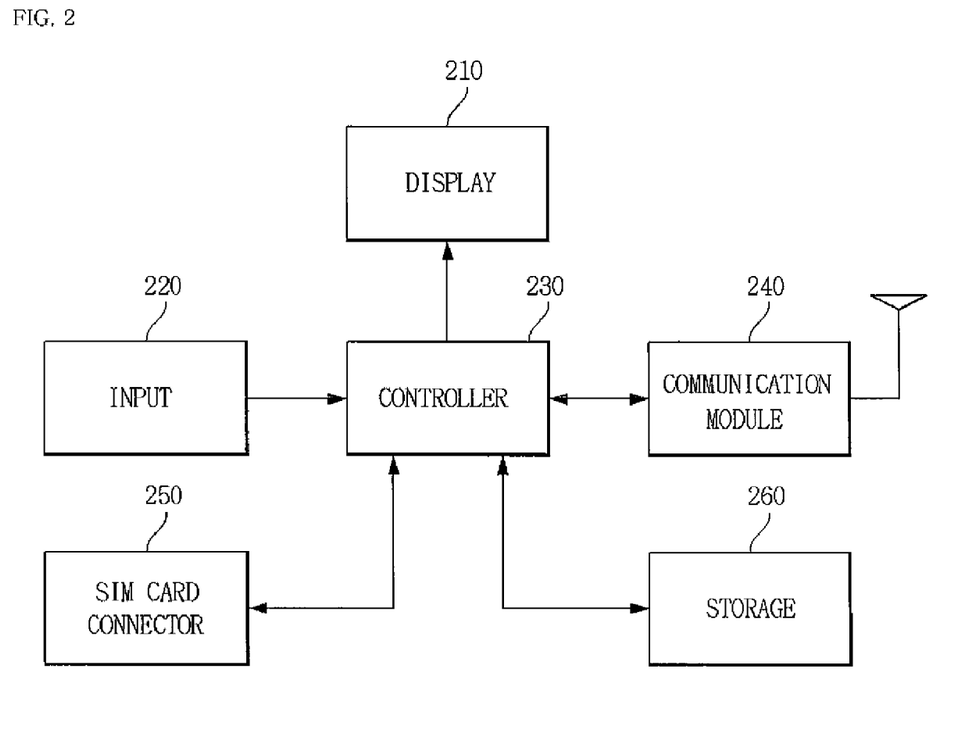
FIG. 2 is a block diagram illustrating an exemplary terminal.

FIG. 2 is a block diagram illustrating an exemplary terminal. The terminal may be a mobile terminal such as a cell phone, Personal Digital Assistant (PDA) or other portable communication device.

Referring to FIG. 2, the terminal 200 includes a display 210, an input 220, a controller 230, a communication module 240, a SIM card connector 250, and a storage 260.

The display 210 displays various information, including an operation status of the terminal 200. The display 210 may display a screen inquiring whether to store a message received through the communication module 240 in a SIM card connected to the terminal through the SIM card connector 250.

The input 220 receives operation commands from a user and transfers the input operation commands to the controller 230. The user may use input 220 to input a command to establish a connection with the MMS server 130, or a command to download a multimedia message from the MMS server 130.

The controller 230 controls the communication module 240 to transmit and receive multimedia data or voice signals for a call with another terminal.

Upon receiving a notification message, the controller 230 compares a recipient number contained in the received notification message with other recipient number contained in other notification message stored in the storage 260. If two numbers are identical, the controller 230 stores the received notification message at the storage 260. But, if two numbers are not identical, the controller 230 stores the received notification message at the SIM card. The controller 230 may download a corresponding multimedia message from the MMS server 130 based on the received notification message stored in the SIM card or the storage 260.

The communication module 240 transmits and receives multimedia data or voice signals for a call with another terminal via the mobile communication network 120. The communication module 240 may establish a connection with the MMS server via the mobile communication network 120. The communication module 240 transmits a multimedia message via the mobile communication network 120, or receives a multimedia message or a notification message via the mobile communication network 120.

The SIM card connector 250 reads subscriber information from the SIM card inserted thereinto, and transfers the subscriber information to the controller 230.

A SIM card (not shown) stores private information of a service subscriber such as an account number, call information, a phone number, and a serial number of the terminal 200. The SIM card has 6 to 8 contacts laid thereon to contact with the SIM card connector 250.

The storage 260 stores data or multimedia messages received through the communication module 240. Here, the multimedia messages may include notification messages.

Figure 3:
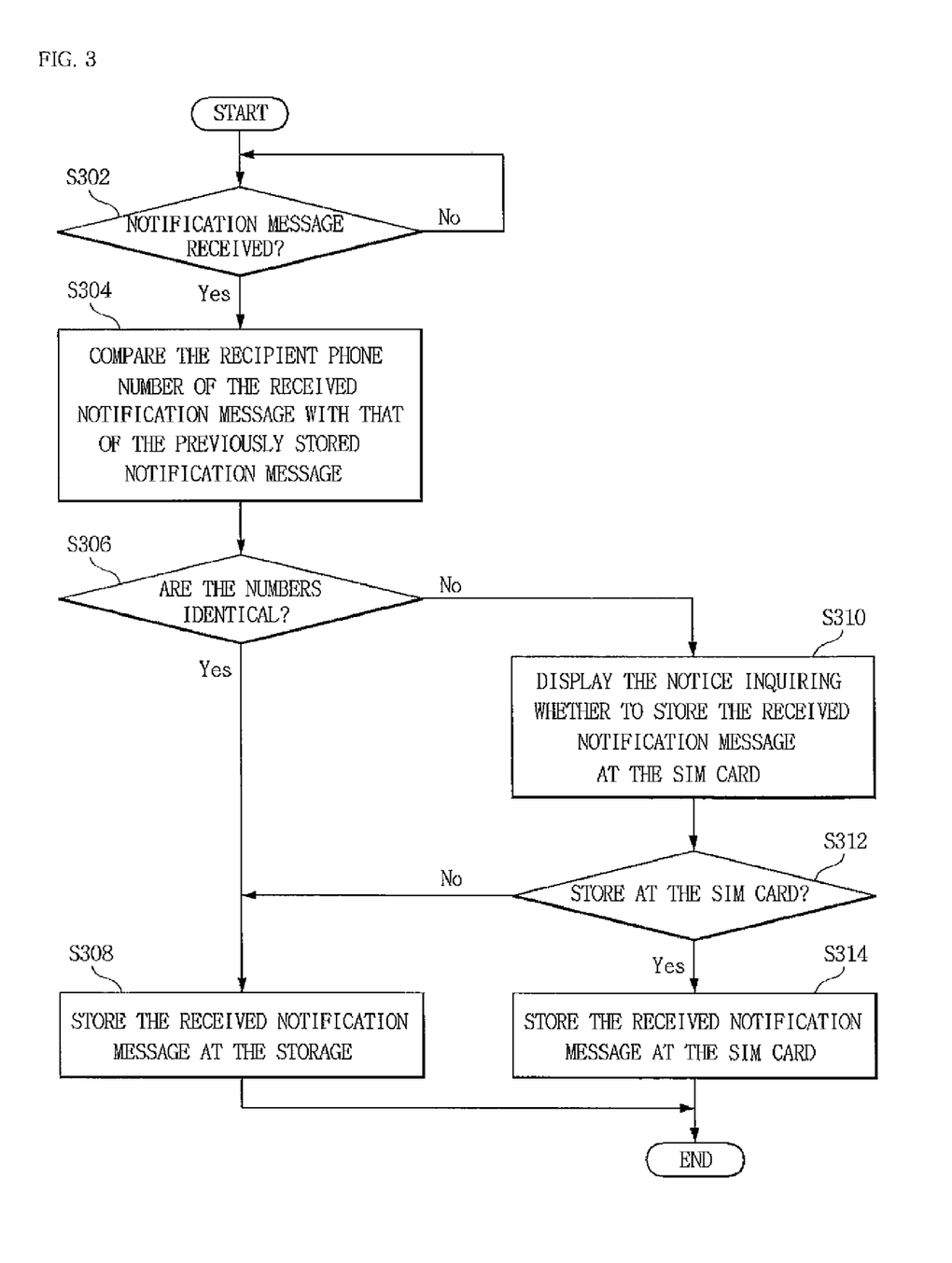
FIG. 3 is a flowchart illustrating an exemplary method for moving a notification message.

FIG. 3 is a flowchart illustrating an exemplary method of the present invention.

It is supposed that an owner of the first terminal 110, a first user, temporarily uses the second terminal 112 by inserting his or her SIM card into the second terminal 112. After the SIM card is inserted, the second terminal 112 notifies the MMS server 130 of the SIM card's new host terminal.

A third user may create a multimedia message using the third terminal 114 and then requesting the MMS server 130 to transmit the created multimedia message to the first terminal 110 of the first user.

The MMS server 130 then transmits a notification message to the second terminal 112 having the SIM card of the first user inserted thereinto via mobile communication network 120 and SMS center 140 upon receiving the request of the multimedia message transmission from the third terminal 114 of the third user.

The second terminal performs a location registration with base stations (not shown) based on the subscriber information stored in the SIM card of the first user. Here, the subscriber information includes a phone number and a serial number of the first terminal 110. Therefore, the base stations may transmit voice signals or signals related to the request of the message transmission to the second terminal 112 based on the subscriber information of the SIM card of the first user with regard to the location registration.

In step S302, the second terminal 112 used by the first user receives the notification message through its communication module 240 indicating that the multimedia message has arrived at the MMS server 130.

Figure 5A:
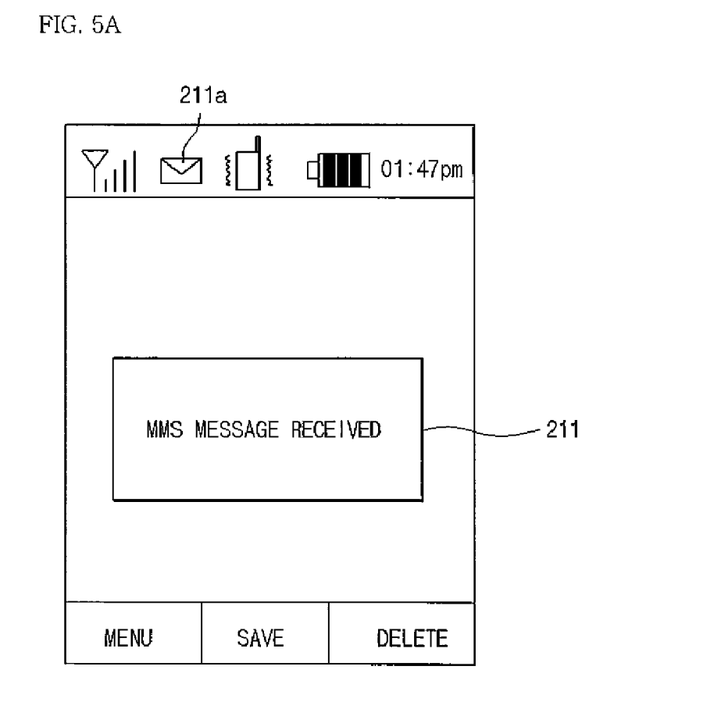
FIGS. 5A to 5C are views illustrating examples of screens displayed on the terminal.

FIG. 5A is a view showing an example of a screen displayed on the display 210. Referring to FIG. 5A, the screen displays an icon 211a indicating the reception of the message upon reception of the message at step S302. The icon 211a may be displayed until the received message is confirmed by the first user.

The screen may display an information prompt in a form of a popup window 211 as shown in FIG. 5A to inform the first user that the notification message for notifying of the arrival of the multimedia message is received.

The second terminal 112 may have previously received a notification message having an owner of the second terminal, second user, assigned as a recipient and stored the received notification message at the storage 260.

A notification message may take up about 2 kilo bytes of packetized data in forms of a Packet Data Unit (PDU) having information of an access route to the MMS server 130.

The notification message received by the MMS server 130 defines fields as listed in following table 1.

TABLE 1

| Name | Content | Comments |
|---|---|---|
| X-Mms-Message-Type | Message-type-value = m-send-req | Mandatory. Specifies the transaction type |
| X-Mms-transaction-ID | Transaction-id-value | Mandatory. A unique identifier for the message. |
| X-Mms-MMS-Version | MMS-version-value | Mandatory. The MMS version number. |
| Date | Date-value | Optional. Arrival time of the message. |
| From | From-value | Mandatory. Address/phone number of the message sender. |
| To | To-value | Optional. Address/phone number of the recipient. |
| Cc | Cc-value | Optional. |
| Bcc | Bcc-value | Optional. |
| Subject | Subject-value | Optional. Subject of the message. |
| X-Mms-Message-Class | Message-class-value | Optional. Class of the message. |
| X-Mms-Expiry | Expiry-value | Optional. Length of time the message will be stored in the MMS server. |
| X-Mms-Priority | Priority-value | Optional. Priority of the message. |
| X-Mms-Sender-Visibility | Sender-visibility-value | Optional. Do not show address/phone number of the sender |
| X-Mms-Delivery-Report | Delivery-report-value | Optional. Specifies whether the user wants a delivery report from each recipient. |
| X-Mms- | Read-reply-value | Optional. Specifies whether |

TABLE 1-continued

| Name | Content | Comments |
| --- | --- | --- |
| Read-Reply | | the user wants a read report from each recipient. |
| X-Mms-Reply-charging | Reply-charging-value | Optional. Present if the originator is willing to pay for the Reply-MM of the recipient(s). |
| X-Mms-Reply-charging-Deadline | Reply-charging-deadline-value | Optional. Specifies the latest time of the recipient(s) to submit the Reply-MM paid by the originator. |
| X-Mms-Reply-charging-Size | Reply-charging-size-value | Optional. Specifies the maximum size (number of octets) for the Reply-MM. |
| X-Mms-Reply-charging-ID | Reply-charging-ID-value | Optional. Same as the Message-ID of the Original-MM that is replied to if this PDU contains the Reply-MM paid by the originator. |
| Content-Type | Content-type-value | Mandatory. The content type of the message. |

The controller 230 identifies a phone number of a recipient in the "To" field of the received notification message, and at step S304 compares the identified recipient phone number with that of any notification message previously stored in the storage 260.

If the second terminal 112 has a SIM card of the second user inserted thereinto, and the recipient of the received notification message is the second user, then the recipient phone number of the received notification message coincides with that of the notification message previously stored in the storage 260.

The controller 230 determines at step S306 whether the recipient phone number of the received notification message is identical to that of the previously stored notification message.

Accordingly, the controller 230 stores at step S308 the received notification message at the storage 260 if it is determined that the recipient phone number of the received notification message coincides with that of the previously stored notification message, a "Yes" is determined at step S306.

If a "Yes" is determined at step S306, the controller 230 may display information on the display 210 or produce a sound or a vibration.

Alternatively, if it is determined that the recipient phone number of the received notification message does not coincide with that of the previously stored notification message, "No" at step S306, the controller 230 displays at step S310 a notice on the display 210 to inform the user that a new message is received and further displays a notice on the display 210 inquiring whether to store the received notification message at the SIM card currently inserted into the second terminal 112.

Figure 5B:
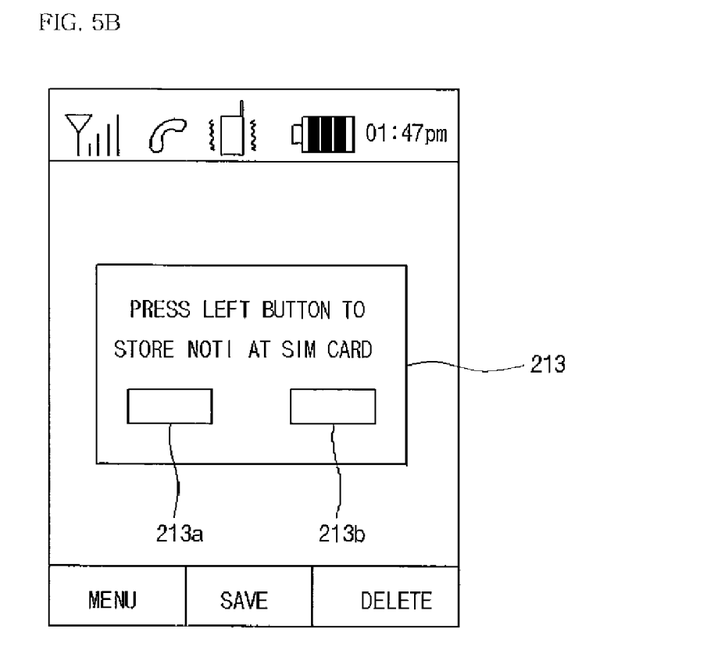

FIG. 5B is a view showing an example of a screen displayed on the display 210. Referring to FIG. 5B, the screen may display a popup window for displaying the notice. The content of the notice may read, for example, as "Press a left button 213a to store the received notification message at the SIM card or press a right button 213b to store the received notification message at the terminal" to allow the first user to select where to store the received notification.

Figure 5C:
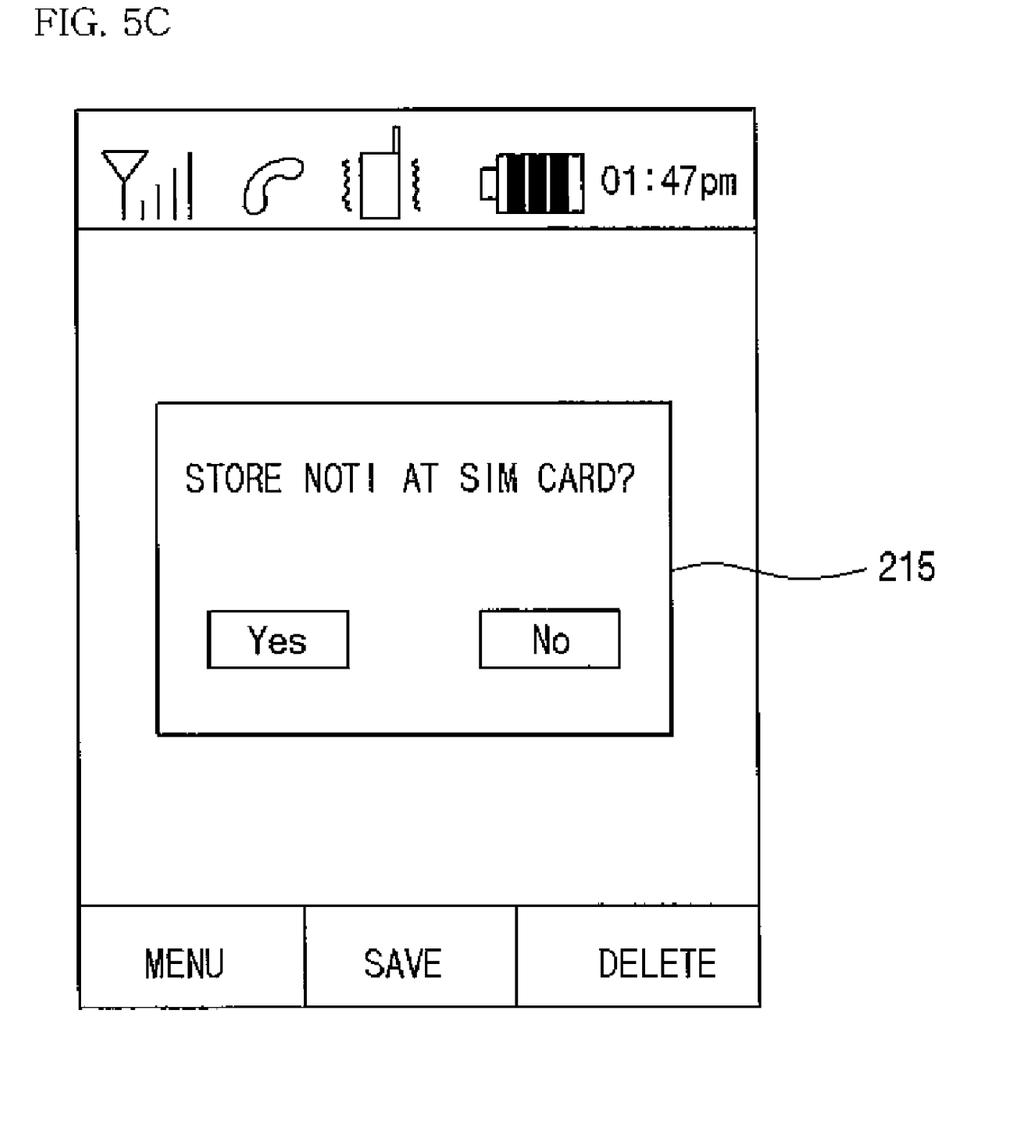

FIG. 5C is a view showing an example of a screen displayed on the display 210. Referring to FIG. 5C, the screen may display a popup window 215 for displaying the notice. The content of the notice may read, for example, as "Store notification message at SIM card?" to allow the first user to select whether to store the received notification at the SIM card.

At step S312, the first user using the second terminal 112 may check the notice displayed on the display 210 to enter an instruction, for example, by selecting the left button to store the received notification message at the SIM card of the first user.

Accordingly, at step 314 the controller 230 stores the received notification message at the SIM card of the first user inserted into the SIM card connector 250.

The controller 230 may further store in the SIM card information about whether the received notification message is confirmed by the first user. This enables another terminal, into which the SIM card is inserted later, to check whether the received notification message is confirmed, whereby the another terminal may display an information prompt in forms of the icon 211a or the popup window 211 as shown in FIG. 5A if the notification message is not confirmed by the first user.

Alternatively, the controller 230 stores the received notification message in the storage 260 of the second terminal 112 if the instruction from the first user is made by selecting the right button.

Upon receiving the notification message, the controller 230 may display a notice inquiring whether to store the received notification message at the SIM card even if no notification message is previously stored in the storage 260. Accordingly, the controller may store the received notification message at the SIM card or at the storage 260 in accordance with the selection of the first user.

After having stored the received notification message at the SIM card inserted into the second terminal 112, the first user may insert the SIM card storing the received notification message into the first terminal 110, and then use the first terminal 110 to download the corresponding multimedia message from the MMS server 130.

Figure 4:
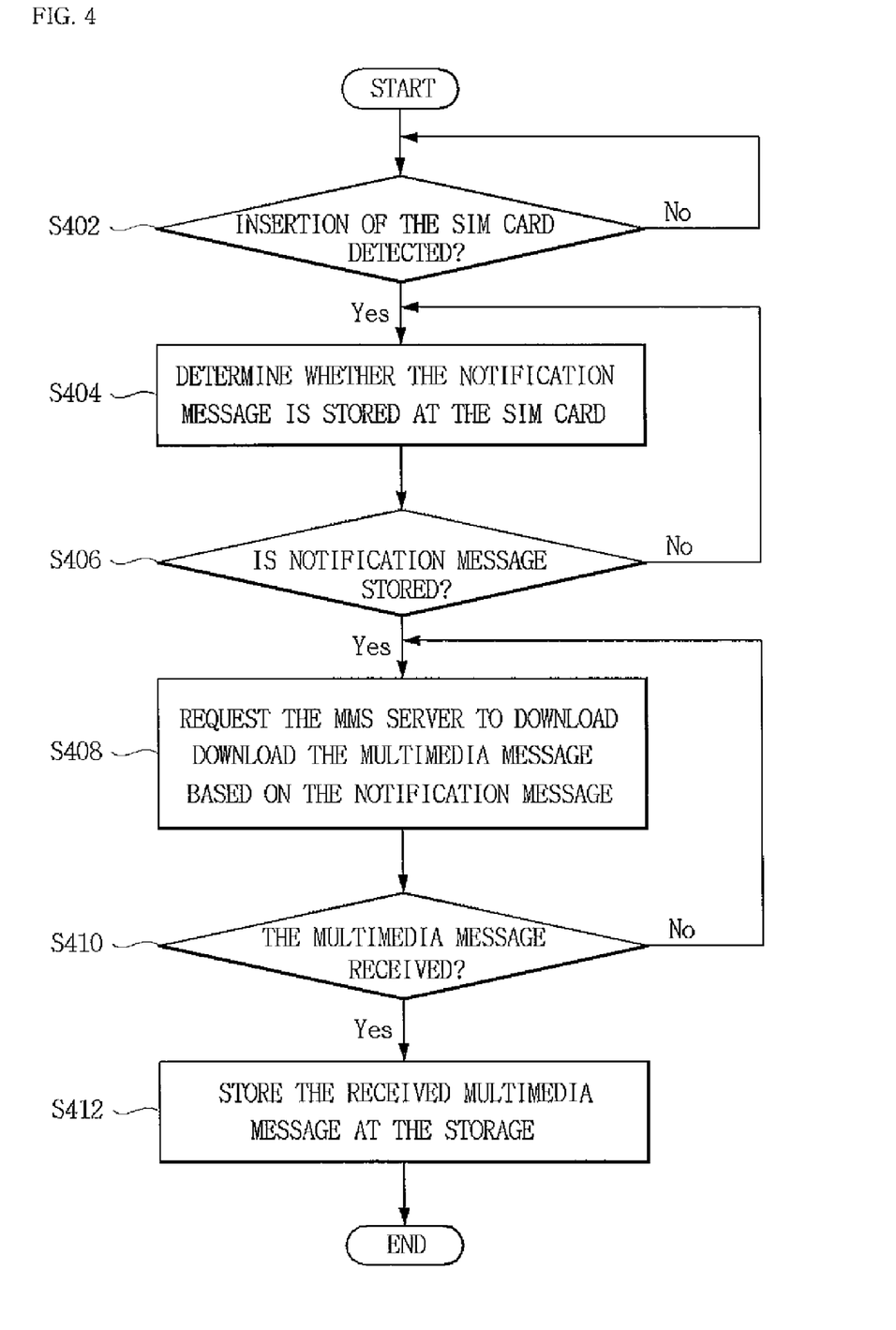
FIG. 4 is a flowchart illustrating another exemplary method for moving a notification message.

FIG. 4 is a flowchart illustrating another exemplary method of the present invention.

If the first user inserts his or her SIM card into the SIM card connector 250 of the first terminal 110, the controller 230 may detect at step S402 the insertion of the SIM card through the SIM card connector 250.

The SIM card connector 250 outputs a high level (or a low level) signal to the controller 230 during when the SIM card is not inserted therein, and switches to output a low level (or a high level) signal to the controller 230 upon inserting of the SIM card thereinto. Thus, the controller 230 may detect the insertion of the SIM card by detecting the level change of the signals from the SIM card connector 250.

Alternatively, the SIM card connector 250 may output a predetermined voltage to the controller 230, and thus the controller 230 may detect a voltage change generated at the time when the SIM card is inserted into the SIM card connector 250, thereby detecting the insertion of the SIM card.

Upon detecting the insertion of the SIM card into the SIM card connector 250, the controller 230 determines at step S404 whether the notification message is stored in the SIM card. The controller 230 identifies content of data stored in the SIM card to search the data in a notification message format including an access route to the MMS server 130.

Upon identifying the notification message through searching of the data stored in the SIM card, "Yes" at step S406, the controller 230 requests the MMS server 130 to download a corresponding multimedia message at step S408 based on the notification message stored in the SIM card.

To this end, the controller 230 transmits a request message to the MMS server 130 for downloading the multimedia message received in the name of the first user. The request message includes information with respect to the first terminal 110 of the first user.

The MMS server 130 retrieves the multimedia message forwarded to the first user from its database based on the request message received from the first terminal 110, and transmits the retrieved multimedia message to the first terminal 110 via the mobile communication network 120.

The first terminal 230 receives the multimedia message at step S410 transmitted from the MMS server 130 through the communication module 240.

The first terminal 230 then stores the received multimedia message at step S412 at the storage 260.

The controller 230 outputs the multimedia message from the storage 260 and displays the multimedia message on the display 210 in accordance with a request of the first user. In case that music or video data is attached on the multimedia message, the attached music or video data may be reproduced through a multimedia reproducing module (not shown) according to a selection of the first user.

Therefore, if the notification message for reception of the multimedia message is received through the second terminal of another user, the notification message may be stored in the SIM card of the first user, and then the first user may insert his or her SIM card into his or her terminal to download the multimedia message.

One implementation of this notification message moving technology is configured to provide a terminal capable of moving a received notification message to another terminal using a SIM card. Therefore, the another terminal may retrieve a multimedia message transmitted to the owner of the SIM card based on the notification message moved with the SIM card.

In the claims, means-plus-function clauses are intended to cover the structure described herein as performing the recited function and not only structural equivalents but also equivalent structures.

The present invention may be practiced in software stored on a computer readable medium such as a disk or computer memory device. A description of how a computer works is found in "How Computers Work," Ron White, Que Publishing, 8th Edition, November 2005, the entire contents of which being incorporated herein by reference.

Other features will be apparent from the description and drawings, and from the claims. Further, other implementations are within the scope of the following claims.

What is claimed is:

1. A method for processing a notification message received in a terminal, wherein the notification message is a message for notifying the terminal of an arrival at a remote Multimedia Message Service (MMS) server of a multimedia message, the method comprising:
    comparing by the terminal a recipient phone number of the received notification message with a recipient phone number of a previously received notification message stored in an internal storage; and
    storing the received notification message in a Subscriber Identity Module (SIM) card installed in the terminal if the recipient phone number of the received notification message and the recipient phone number of the previously received notification message are not identical.

2. The method of claim 1, further comprising:
    displaying by the terminal a screen prompting a user to select whether or not to store the received notification message in the SIM card.

3. The method of claim 1, further comprising:
    storing the received notification message in the SIM card if there is no previously received notification message stored in the internal storage.

4. The method of claim 1, wherein the step of storing comprises:
    storing information about whether the received notification message is confirmed by a user.

5. The method of claim 1, further comprising:
    displaying an information prompt to inform a user that the notification message is received.

6. The method of claim 2, further comprising:
    storing the received notification message in an internal storage if the user selects not to store the received notification message in the SIM card.

7. The method of claim 1, wherein the notification message stored in the SIM card is used for downloading the multimedia message from the remote MMS server to an other terminal if the SIM card is moved from the terminal to the other terminal.

8. The method of claim 7, further comprising:
    displaying an information prompt indicating the arrival of the multimedia message if the notification message is not confirmed before the SIM card is moved from the terminal to the other first terminal.

9. A terminal configured to process a notification message, the terminal comprising:
    a storage;
    a Subscriber Identity Module (SIM) card connector configured to connect to a SIM card;
    a communication module configured to receive a notification message of an arrival of a multimedia message addressed to the SIM card; and
    a controller configured to store the received notification message in the SIM card if a recipient phone number included in the received notification message is not identical to a recipient phone number of a previously received notification message stored in the storage.

10. The terminal of claim 9, further comprising:
    a display configured to display to display a screen prompting a user to indicate whether or not to store the received notification message in the SIM card, wherein the received notification message is stored in the SIM card upon a user selection.

11. The terminal of claim 10, wherein the controller stores the received notification message in the storage if the user does not select to store the received notification message in the SIM card.

12. The terminal of claim 9, wherein the controller stores the received notification message in the storage if the recipient phone numbers of the received notification message and the previously received notification message are identical.

13. The terminal of claim 12, wherein the controller stores the received notification message in the SIM card if there is no previously received notification message stored in the storage.

14. The method of claim 1, further comprising:
    notifying the remote Multimedia Message Service (MMS) server that the SIM card of an other terminal is installed in the terminal.

15. The terminal of claim 9, wherein the controller notifies the remote Multimedia Message Service (MMS) server that the SIM card of an other terminal is installed in the terminal.

* * * * *